No. 742,663. PATENTED OCT. 27, 1903.
C. F. IGELMANN.
BAKER'S OVEN.
APPLICATION FILED AUG. 30, 1902.
NO MODEL. 4 SHEETS—SHEET 2.

Witnesses,
Inventor,
Chas. F. Igelmann,
By Joseph A. Minturn
Attorney,

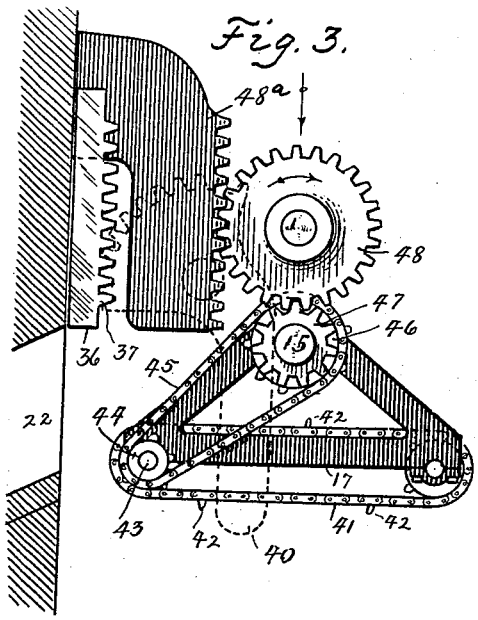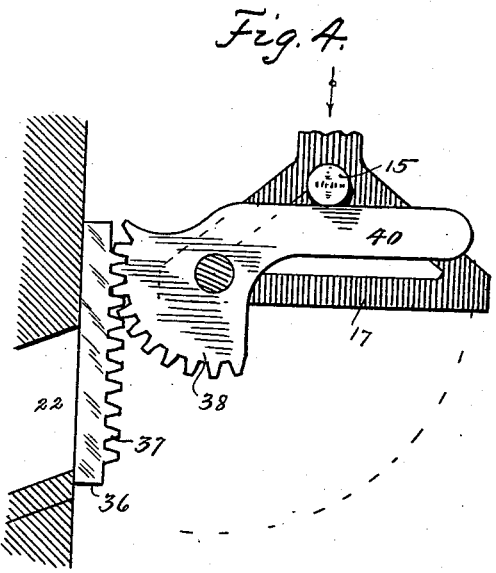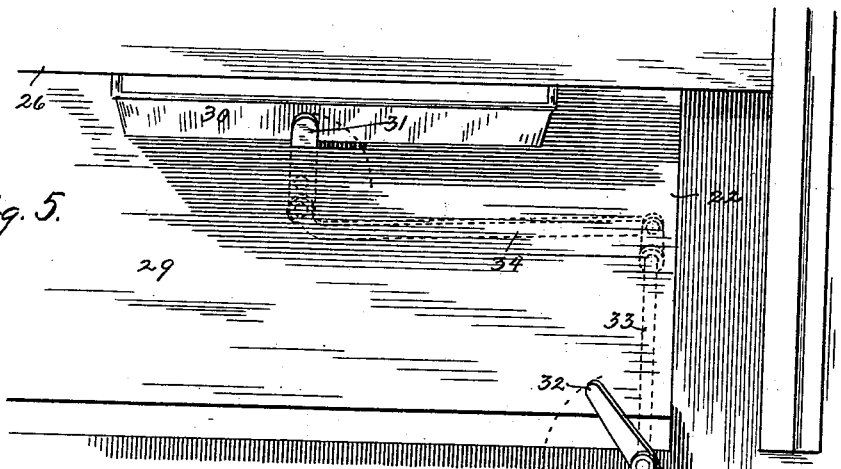

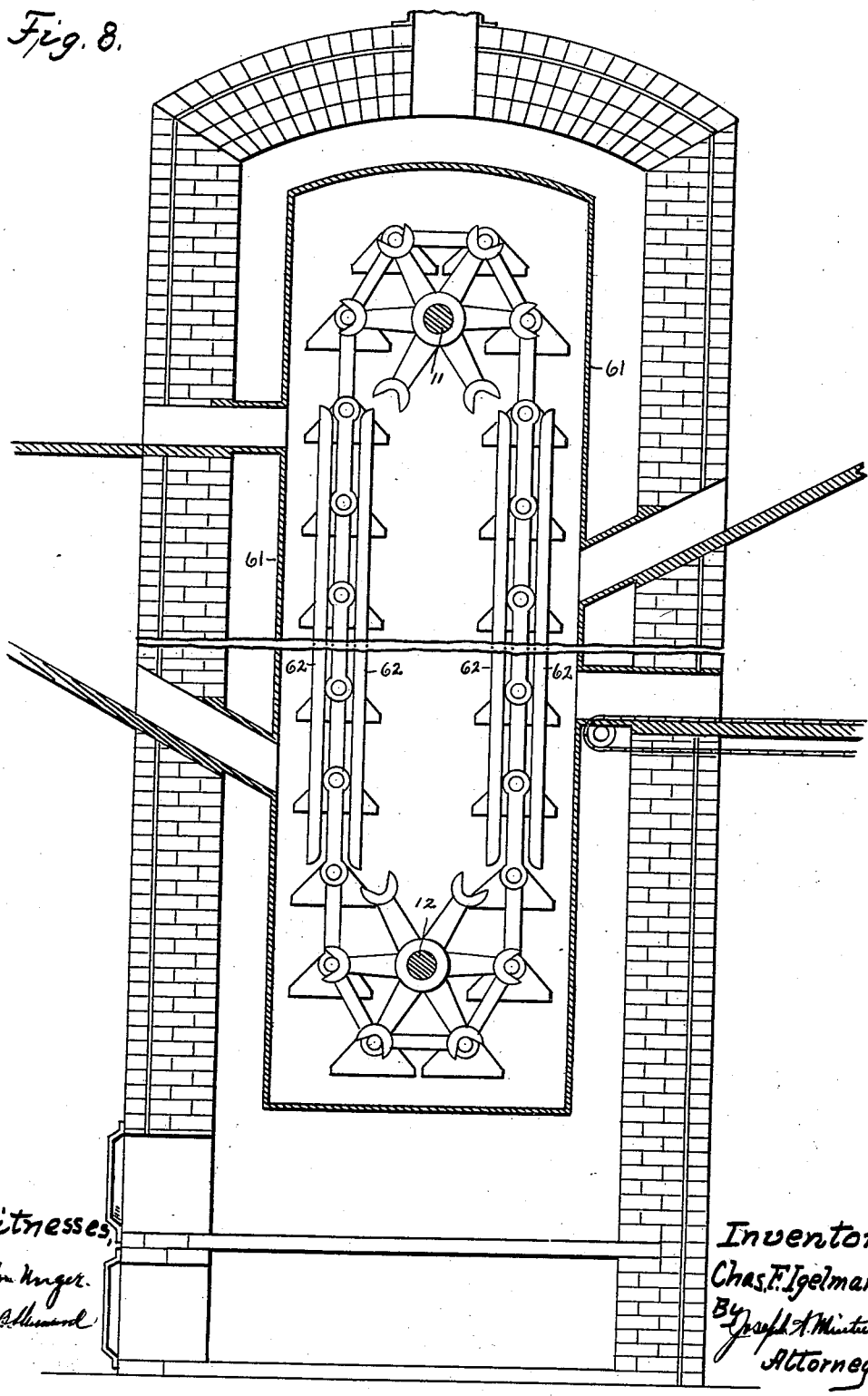

No. 742,663.

Patented October 27, 1903.

UNITED STATES PATENT OFFICE.

CHARLES F. IGELMANN, OF INDIANAPOLIS, INDIANA.

BAKER'S OVEN.

SPECIFICATION forming part of Letters Patent No. 742,663, dated October 27, 1903.

Application filed August 30, 1902. Serial No. 121,602. (No model.)

*To all whom it may concern:*

Be it known that I, CHARLES F. IGELMANN, a citizen of the United States, residing at Indianapolis, in the county of Marion and State of Indiana, have invented certain new and useful Improvements in Bakers' Ovens, of which the following is a specification.

This invention relates to improvements in baking-ovens; and the object of the invention is to provide an oven having a series of traveling shelves to receive the dough which will be brought in succession opposite inlet and discharge openings through the oven-wall. The object also is to provide automatic means for conveying the dough to the oven and for removing the baked product therefrom and for automatically opening and closing the apertures in the wall through which the product is introduced and removed from the oven.

The invention also provides for the economical use of fuel required for heating the oven and embodies certain details of construction rendering the oven effective in its operation and simple and durable, such as will be fully specified, and particularly pointed out in the claims.

I accomplish the objects of the invention by the mechanism illustrated in the accompanying drawings, in which—

Figure 1:
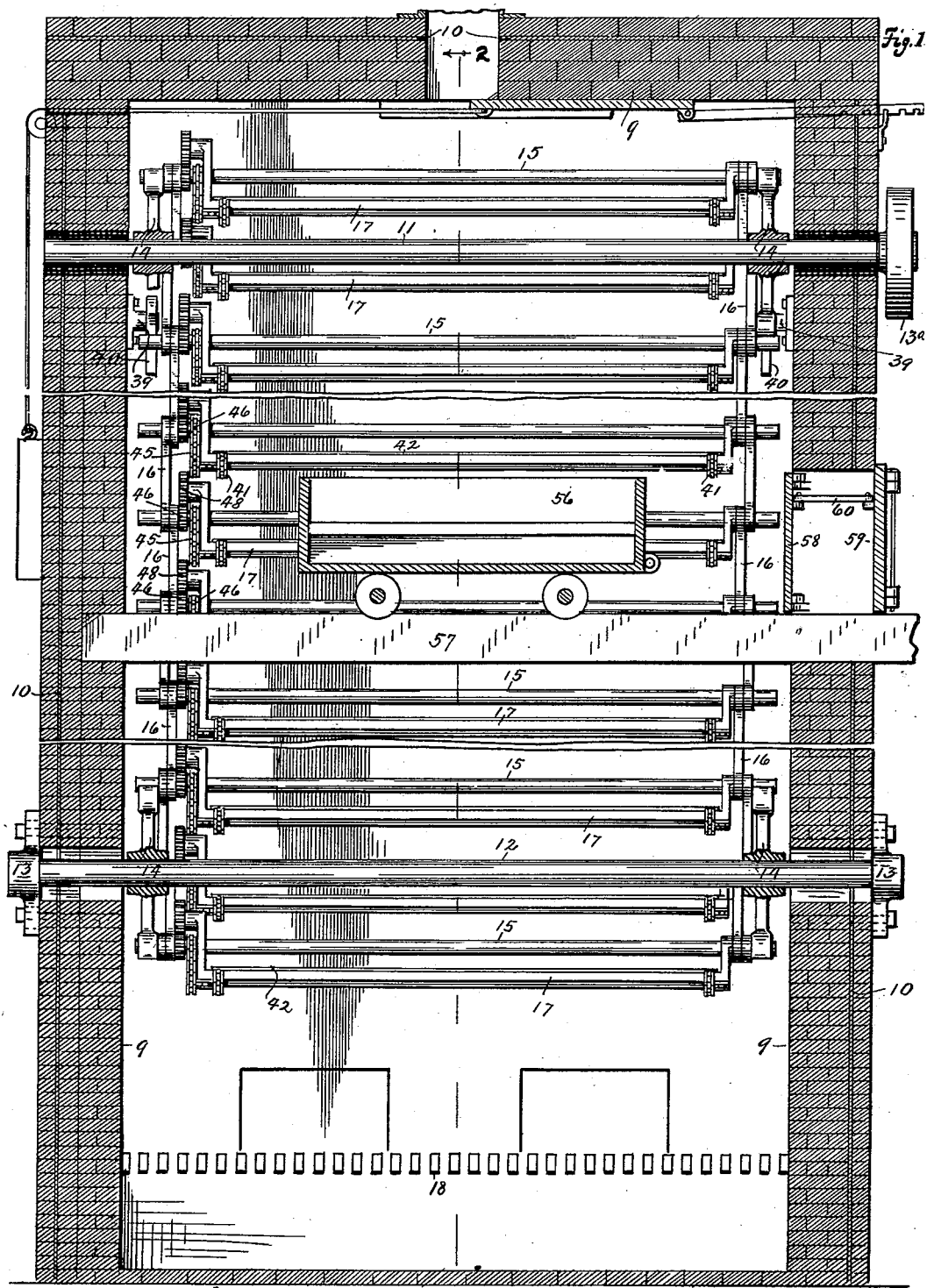
Figure 2:
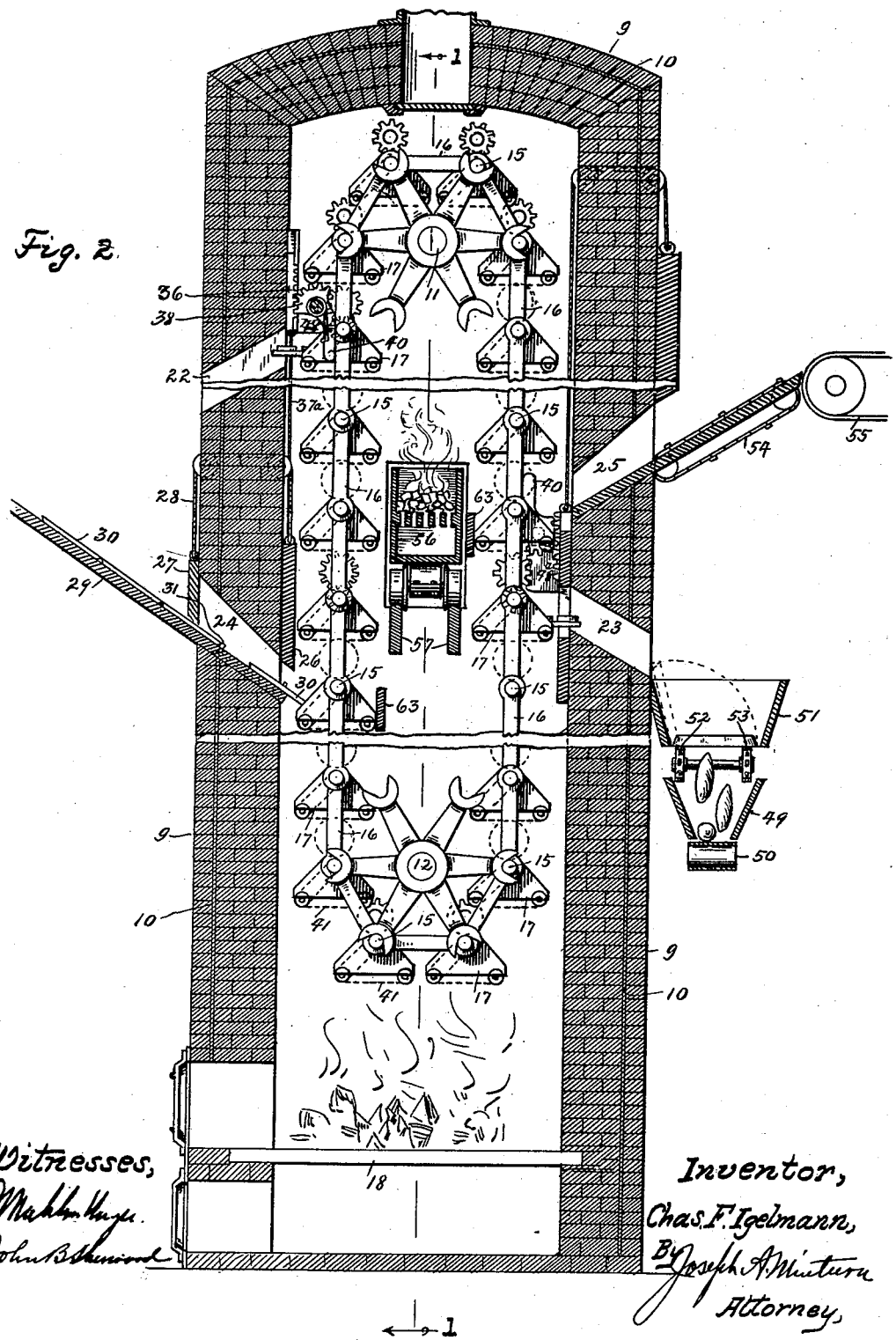

Figure 1 is a vertical central section of my invention on the line 1 1 of Fig. 2; Fig. 2, a vertical central section on the line 2 2 of Fig. 1; Fig. 3, a detail showing one of my traveling shelves in end view with mechanism in operative position for discharging the baked product; Fig. 4, a detail showing the said shelf with the discharging mechanism left off in order to avoid confusion of parts, but showing the mechanism for raising the door which covers the discharge-opening; Fig. 5, a detail looking from the inside of the oven toward the receiving-chute and showing the mechanism for regulating the movement of pans down said chute into the oven; Fig. 6, a top or plan view of one of the shelves; Fig. 7, a detail in vertical section of the shelf on the dotted line 7 7 of Fig. 6, and Fig. 8 a detail in transverse vertical section of a modified form of oven.

Like characters of reference indicate like parts throughout the several views of the drawings.

9 represents the walls and top of the oven, which are of brick, of usual construction, except that I incorporate a layer of asbestos 10 in the brickwork in order to more completely retain the heat. Mounted in suitable journal-boxes in the end walls of the oven are the parallel shafts 11 and 12. The top shaft 11 has the belt-pulley 13ª on an end projecting outside of the oven, and a motion of rotation is given to the shaft by belt connection (not shown) with any suitable motor. The shaft 12 is mounted in the vertically-adjustable boxes 13, whereby the shaft may be adjusted in its distance from the shaft 11 for purposes which will be hereinafter explained. Each shaft 11 and 12 has a pair of spiders 14, the arms of which terminate in notches which form seats for the ends of shafts 15. The shafts 15 are connected in parallel series by link bars 16, the latter being arranged in double series, each series forming an endless link belt. Suspended from each of the shafts 15 is a shelf 17, having a swinging adjustment therefrom. When the upper shaft 11 is rotated, the entire series of shelves will be moved in a continuous circuit around both of the shafts 11 and 12.

At the bottom of the oven a suitable distance below the shaft 12 are the grate-bars 18, upon which the fire for heating the oven is kindled, and it will be seen that the shelves are constantly within the column of heated air rising from the fire.

The adjustment of the lower shaft 12 referred to above is for the purpose of permitting a separation of the shafts 11 and 12 sufficiently to take up any slack that may occur in the link belts.

Upon the shelves 17 the dough, in pans or not, according to the character of the product to be produced, is placed, and in order to give the heat as direct access to the dough as possible I provide an open-work shelf, such as is shown in Figs. 6 and 7, in which 19 is a marginal frame having transverse cross-bars 20, over all of which is the coarse wire-cloth 21. The bars 20 have upper knife-edges in order to minimize the obstruction of heat through the perforate bottom, and the wire-cloth retains small articles which would pass between the bars.

Other perforate material than wire-cloth may be used, and where pans are used for the dough the perforate material may be wholly dispensed with, the bars in that case supporting the pans.

Openings 22 and 23 will be provided through the sides of the oven for the discharge of the baked product and openings 24 and 25 for the supply of the dough. These will be closed, except during the moments of supply and discharge, by vertically-sliding doors, which will be operated automatically by the passing shelves.

The accompanying drawings represent an oven which is of a height equal to several stories of an ordinary-sized building and is calculated to bake a double charge of material at each complete circuit of the shelves. The dough is introduced on one side, as through opening 24, and taken out on the other side, baked, through opening 23. The empty shelf is immediately filled through opening 25 and the baked product discharged through opening 22. As the inlets open upwardly from the inside of the oven, thereby affording a natural and easy outlet for the upwardly-tending heat, I prefer to provide the double doors 26 and 27 on either side of the oven-wall, suspended and connected as shown, whereby when one is open the other will be closed. The doors are suspended from the cable 28, which passes over suitable pulleys. The inlet is at the bottom of the incline 29, down which the pans 30, containing the dough, are moved by gravity. To keep the pans from being fed in too fast, I provide a stop, which is the projecting end of a lever 31, (see Fig. 5,) which is pivoted to the under side of the incline and swings through a slot in the incline into the path of the pans. An arm 32 in the path of the door 26 is attached to a rocking shaft 33, and an arm on the outer end of shaft 33 is connected by bar 34 with lower end of lever 31. The spring 35 sets the stop mechanism when the arm 32 is released by the raising of the door, so as to arrest all but the lower pan and hold them back far enough to permit the door 27 to close. As soon as the door 26 is raised the lower pan will slide into the oven upon one of the shelves, which must be ready to receive it.

The doors 26 and 27 are opened and closed by the movement of the upper door 36, to which they are connected by cable 37ª. (See Fig. 2.) The door 36 closes the discharge-opening 22. It has the rack-bars 37 adjacent to its ends, which are engaged by the toothed segments 38, which are pivotally supported from the end walls of the oven, as shown at 39 in Fig. 1. These segments 38 (see Fig. 4) have the levers 40, which stand across the path of shafts 15 when the door 36 is in closed position, and the levers are moved into the position shown by dotted lines in Fig. 3 by the action of the said shaft 15, thereby raising the door 36. This opening of the door 36 opens door 26 and closes door 27. When the levers 40 are released by the passing of shaft 15, the weight of doors 26 and 36 causes the doors to close, which also returns the levers to their horizontal position. (Shown in Fig. 4.)

The automatic discharge of the baked material is accomplished by the following means: The shelves have the transverse link belts 41 passing around them over suitable wheels, and these belts carry scrapers 42, running longitudinally of the shelves, which are carried around the said shelves by the movement of said belts. Shaft 43, on which sprocket-wheels carrying said belts are mounted, has the sprocket-wheel 44, which is connected by belt 45 with sprocket-wheel 46 on shaft 15. Sprocket-wheel 46 has integral cog-wheel 47, which meshes with cog-wheel 48. The latter is larger in diameter than wheel 47 and engages with the teeth of a stationary rack 48ª, secured to the inside of the oven-wall in right relation with the discharge-opening to cause the above mechanism to be actuated as its shelf passes said discharge-opening. The baked product will preferably be discharged into a trough having a belt-carrier at its bottom which will carry the material to any desired part of the bakery. 49 represents such a trough having a carrier 50, (see Fig. 2,) and above it is the trough 51, having a pair of carrier-belts 52 and 53, by which the bread-pans are arrested and carried out of the way, while the bread or other product is dropped between the carrier-belts 52 and 53 to the carrier 50 below. The pan drops from the outlet into the position shown in dotted lines and then turns bottom side up, thereby emptying the contents.

The dough may be supplied to the oven on carriers, as shown at 54 and 55 of Fig. 2, in order that the delivery of the unbaked material and the removal of the finished product from the oven may be done without handwork.

In a tall oven, as provided in this invention, auxiliary fires may be provided at points above the one at the bottom in order to insure a baking as distinguished from a drying heat. These auxiliary fires are supported in portable fire-boxes 56, which are mounted on wheels and are run in and out of the oven on tracks 57. The oven-opening will preferably be protected by double doors 58 and 59, which are connected by bar 60, whereby the opening or closing of the outer door will in like manner operate the inner one.

In the modification shown in Fig. 8 the shelves are contained within an inner shell 61, preferably of sheet metal, in order that soft coal may be burned in the fire as fuel and the smoke allowed to escape between the shell and the oven-walls through the passage-ways left for that purpose. Fig. 8 shows the vertical guides 62 arranged in pairs to retain the links which support the shelves in constant vertical alinement. Similar guides will be used in the oven shown in Figs. 1 and 2; but they are not shown in those figures, for the reason that they would obstruct and confuse the drawings.

The transverse bars 63 (shown in Fig. 2) are to keep the pans and dough from sliding on into the oven past the shelves when the delivery is made to the oven.

Having thus fully described my invention, what I claim as new, and wish to secure by Letters Patent, is—

1. A vertical oven, a horizontal revoluble shaft supported by the oven-walls near the top of said oven, spiders mounted on said shaft, endless link belts carried around the shaft by said spiders, shelves supported by said belts, and means actuated from the inside by the carrier mechanism for charging the shelves with dough and for discharging the baked product.

2. In a baker's oven for automatically supplying the dough and removing the baked product, an oven, traveling shelves located therein, supply and discharge openings through the oven-walls, doors to said openings, means operated by the shelves for opening the supply-door admitting a charge of dough to the shelf and then closing the door, means for opening the outlet-door by the action of the shelf as the shelf passes said outlet and for discharging the baked product and for closing the door, said means being controlled by the passing shelf, and carriers to deliver the dough to the supply-opening and to carry the baked product away from the discharge-opening.

3. A vertically-elongated oven having openings for the supply and discharge of baker's product, vertically-sliding doors at said openings said doors having inside teeth forming racks, shafts having a vertical travel in said oven said shafts carrying suspended shelves to receive said product, levers pivotally secured near said openings and standing normally across the paths of said shafts said levers having toothed segments which engage the toothed racks of the doors.

4. A vertically-elongated oven having discharge-openings and vertical racks adjacent to said openings, vertically-traveling shelves passing said openings, a cog-wheel carried by the shelf having teeth which engage the teeth of said rack, said cog-wheel engaging a pinion on a sprocket-wheel and means actuated from said sprocket-wheel for discharging the baked product from the shelf into said discharge-opening.

5. In a baker's oven, a supply-opening, a door therefor, an inclined supply-chute, an adjustable stop in said incline and means operated by the door for placing and removing the stop.

6. A vertically-elongated baker's oven having a fire at its bottom, shelves having a vertical travel in said oven, and portable auxiliary fire-boxes adapted to be introduced into the oven above the lower fire and removed, at the will of the baker.

In witness whereof I have hereunto set my hand and seal, at Indianapolis, Indiana, this 25th day of August, A. D. 1902.

CHARLES F. IGELMANN. [L. S.]

Witnesses:
J. A. MINTURN,
S. MAHLON UNGER.